US012620616B2

(12) United States Patent
Yang et al.

(10) Patent No.: US 12,620,616 B2
(45) Date of Patent: May 5, 2026

(54) ELECTRODE ASSEMBLY FOR SECONDARY BATTERY AND METHOD OF MANUFACTURING SAME

(71) Applicant: SK On Co., Ltd., Seoul (KR)

(72) Inventors: Ji Won Yang, Daejeon (KR); Young Rae Oh, Daejeon (KR); Jae Young Jung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 679 days.

(21) Appl. No.: 18/091,946

(22) Filed: Dec. 30, 2022

(65) Prior Publication Data

US 2023/0216078 A1     Jul. 6, 2023

(30) Foreign Application Priority Data

Dec. 31, 2021   (KR) ........................ 10-2021-0193916
Dec. 6, 2022    (KR) ........................ 10-2022-0169135

(51) Int. Cl.
H01M 10/04          (2006.01)
(52) U.S. Cl.
CPC ............................... H01M 10/0431 (2013.01)
(58) Field of Classification Search
CPC ............. H01M 10/0431; H01M 10/04; H01M 10/052; H01M 50/466; H01M 10/0525; H01M 10/0583; H01M 50/406; H01M 10/0459; H01M 50/461; H01M 10/0404; H01M 10/0413; H01M 50/46; Y02E 60/10; Y02P 70/50
See application file for complete search history.

(56) References Cited

U.S. PATENT DOCUMENTS

| 11,090,827 | B2 | 8/2021 | Yamamoto et al. | |
| 2009/0291355 | A1* | 11/2009 | Baba .................... | H01M 50/449 |
| | | | | 429/129 |
| 2015/0221900 | A1* | 8/2015 | Seong ................. | H01M 50/105 |
| | | | | 429/185 |
| 2020/0227787 | A1† | 7/2020 | Kang | |

(Continued)

FOREIGN PATENT DOCUMENTS

| CN | 109546230 | A | † | 3/2019 | |
| CN | 109560322 | A | † | 4/2019 | |
| JP | 2013179035 | A | * | 9/2013 | ........ H01M 10/0404 |

(Continued)

OTHER PUBLICATIONS

JP-2013179035-A (Machine translation) (Year: 2013).*

(Continued)

*Primary Examiner* — James M Erwin
*Assistant Examiner* — Sarah Arimintia Applegate
(74) *Attorney, Agent, or Firm* — IP & T GROUP LLP

(57)          ABSTRACT

Proposed is an electrode assembly for a secondary battery, the electrode assembly includes a stacked body including a first electrode plate, a second electrode plate, and a separator interposed between the first electrode plate and the second electrode plate, and an outer periphery of the stacked body may be wound with the separator for exterior finishing. In addition, the present disclosure may include a method of manufacturing an electrode assembly for a secondary battery that is externally finished with a separator.

13 Claims, 10 Drawing Sheets

(56)  References Cited

U.S. PATENT DOCUMENTS

2021/0107017 A1      4/2021   Deshpande
2022/0246974 A1 *    8/2022   Park ................... H01M 10/052

FOREIGN PATENT DOCUMENTS

| | | | |
|---|---|---|---|
| KR | 20000051741 | A  | 8/2000 |
| KR | 20-0209933  | Y1 | 1/2001 |
| KR | 20120118759 | A  | 10/2012 |
| KR | 10-1505309  | B1 | 3/2015 |
| KR | 10-2050862  | B1 | 12/2019 |
| KR | 20200095896 | A  | 8/2020 |
| KR | 10-2183796  | B1 | 11/2020 |
| WO | WO-2022177179 | A2 * | 8/2022   ........ H01M 10/0431 |

OTHER PUBLICATIONS

WO-2022177179-A2 (Machine translation) (Year: 2022).*
Extended European Search Report for the European Patent Application No. 22217284.3 issued by the European Patent Office on Sep. 6, 2023.
European Search Report dated Apr. 28, 2023 issued by the EPO.

\* cited by examiner
† cited by third party

S400

S500

1

ELECTRODE ASSEMBLY FOR SECONDARY BATTERY AND METHOD OF MANUFACTURING SAME

The present application claims priority to Korean Patent Application No. 10-2021-0193916, filed Dec. 31, 2021, and KR Patent Application No. 10-2022-0169135, filed Dec. 6, 2022, each of which is incorporated herein for all purposes by this reference.

BACKGROUND OF THE INVENTION

1. Field of the Invention

The present disclosure relates to an electrode assembly for a secondary battery. More particularly, the present disclosure relates to an electrode assembly that is wound with a separator to finish the exterior.

2. Description of the Related Art

Secondary batteries can be repeatedly charged and discharged and can be applied to various fields such as mobile devices, electric vehicles (EVs), hybrid vehicles (HEVs), energy storage systems (ESSs), and the like. In regard to such secondary batteries, products that can output more compact and stronger power have been developed.

Typically, a secondary battery is composed of an electrode assembly and an exterior pouch material for encasing the electrode assembly and an electrolyte, in which the electrode assembly is composed of a cathode plate, an anode plate, and a separator. An insulating tape is attached to the outer peripheral surface of an electrode assembly that is a rolled stack of a cathode plate, an anode plate, and a separator to maintain the rolled and stacked state of the electrode assembly.

As disclosed in Patent Document 1, in the case of the conventional electrode assembly, an insulating tape is attached to the stacked surface of a stacked body of a cathode plate, an anode plate, and a separator. The ends of the insulating tape wound around the electrode assembly overlap on the outer peripheral surface of the electrode assembly, the thickness of the electrode assembly in the direction of stacking inevitably increases.

As known to those skilled in the art, the thickness of secondary batteries has been gradually reduced in order to increase energy density, that is, volume energy density (energy per unit volume of battery). However, the electrode assembly, which is finished with a taping method as in Patent Document 1, has a result that goes against the trend of reducing the thickness of a secondary battery.

Documents of the Related Art

Patent Document (Patent Document 1) Korean Patent No. 10-2183796

SUMMARY OF THE INVENTION

The present disclosure has been created to solve the above-described problems, and an objective of the present disclosure is to provide an electrode assembly in Which an exterior surface of a stack thereof is finished with a separator.

In addition, the present disclosure includes an electrode assembly manufacturing method by which the exterior of the electrode assembly is finished by winding an unfolded winding part of a separator.

In order to achieve the above objective, an electrode assembly for a secondary battery according to the present disclosure includes a stacked body including: a first electrode plate; a second electrode plate; and a separator interposed between the first electrode plate and the second electrode plate, in which an outer periphery of the stacked body is wound with the separator for exterior finishing.

Preferably, a bonding region of the separator may be positioned on a vertical surface orthogonal to a stacking direction of the stacked body.

In an embodiment of the present disclosure, the separator includes a folding part folded to allow the first electrode plate and the second electrode plate to be alternately stacked and a winding part continuously extending from an end of the folding part. The winding part may wind the outer surface of the stacked body and may be extended in length so as to position a winding end on a vertical surface orthogonal to the stacking direction of the stacked body.

In addition, the folding part may be folded in a zigzag shape. Alternatively, the winding end may cover more than ½ of the height of vertical surface orthogonal to the stacking direction.

In addition, according to the present disclosure, the winding end of the separator may be bonded with a bonding member disposed on an outer surface of the winding part that winds the outer periphery of the stacked body.

In the present disclosure, the winding end of the separator may have irregularities having a is depth ranging from 0 mm to 2 mm on a cut surface.

Furthermore, the bonding member may include an adhesive.

A method of manufacturing an electrode assembly for a secondary battery according to the present disclosure includes: forming a stacked body in which a first electrode plate and a second electrode plate are alternately stacked between a folded separator; cutting the separator to have an extended length capable of winding around an outer periphery of the stacked body; winding an outer periphery of the stacked body with the separator; applying a bonding member on the outer surface of the stacked body; and bonding the separator to a bonding member applied to an outer surface of the stacked body.

In an embodiment of the present disclosure, the separator includes a folding part folded to allow the first electrode plate and the second electrode plate to be alternately stacked and a winding part continuously extending from an end of the folding part. The winding part may wind the outer surface of the stacked body and may be extended in length so as to position a winding end on a vertical surface orthogonal to the stacking direction of the stacked body.

In the applying of the bonding member, the bonding member may be applied on the vertical surface orthogonal to the stacking direction of the stacked body.

In the bonding of the separator, the winding end of the separator may be is pressed against and brought in close contact with the vertical surface of the stacked body.

The method of the present disclosure may further include providing a tension to the separator before cutting the separator.

Alternatively, the method of the present disclosure, may further include preheating a preset cutting line portion of the separator.

In the present disclosure, the winding end of the separator may have irregularities having a depth ranging from 0 mm to 2 mm on a cut surface.

Features and advantages of the present disclosure will become more apparent from the following detailed description taken in conjunction with the accompanying drawings.

Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its disclosure in the best way possible.

According to the description of the present disclosure above, the present disclosure is provided so that the outer circumference of the electrode assembly is wound with a separator for exterior finishing.

In particular, according to the present disclosure, winding ends of the separator are bonded by means of an adhesive applied on a vertical surface orthogonal to the stacking direction of the electrode assembly. Accordingly, according to the present disclosure, an electrode assembly having a thin and uniform thickness can be manufactured without an increase in the thickness in the stacking direction by arranging a bonding region on a vertical surface of the electrode assembly, and the energy density of a secondary battery using the electrode assembly manufactured in this way can be increased. In addition, according to the present disclosure, since the bonding region is disposed on the vertical surface as described above, the stacked surface of each electrode assembly is flat whereby the electrode assemblies can be easily stacked in the stacking direction of each electrode assembly.

According to the present disclosure, the winding end of the separator can be easily bonded by means of an adhesive, and the separator can be reliably and easily fixed even on the vertical surface narrower than the horizontal surface of the electrode assembly.

According to the present disclosure as described above, since the outer surface of the electrode assembly is wound by the separator, it is possible to prevent the components of the electrode assembly from being separated from each other at boundaries of the components.

In addition, the present disclosure provides an electrode assembly with a cut end that is well trimmed because the cut end is processed to be smooth.

DESCRIPTION OF THE PREFERRED EMBODIMENTS

Figure 1:
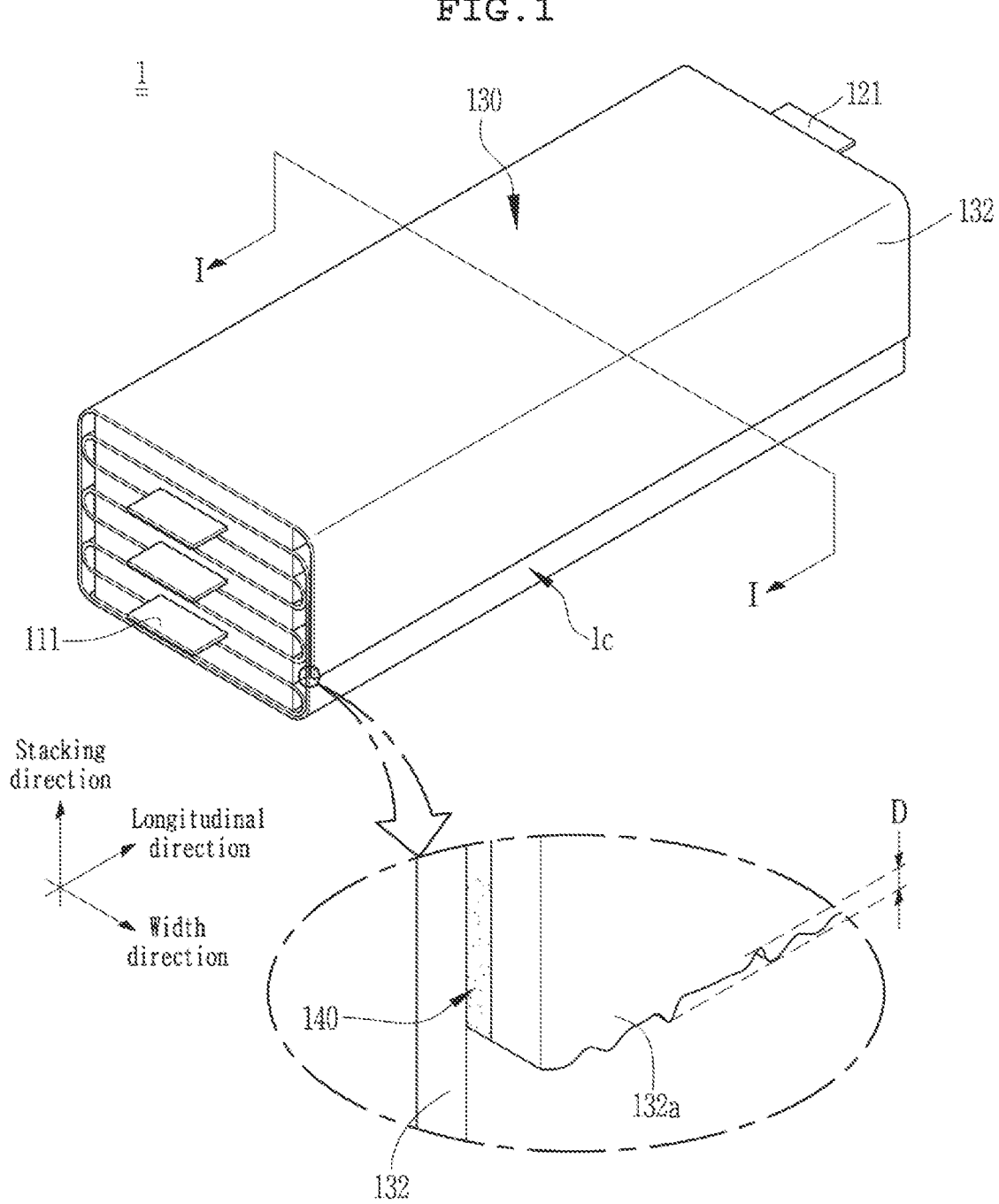
FIG. 1 is a perspective view schematically showing an electrode assembly for a secondary battery according to an embodiment of this disclosure.

The above and other objectives, features, and advantages of the present disclosure will be more clearly understood from the following detailed description taken in conjunction with the accompanying drawings, but the present disclosure is not limited thereto. In describing the present disclosure, when the detailed description of the relevant known technology is determined to unnecessarily obscure the gist of the present disclosure, the detailed description may be omitted.

The examples described in this document and the accompanying drawings are not intended to limit the present disclosure to specific embodiments. It should be understood that this disclosure covers various modifications, equivalents, and/or alternatives of the embodiments.

In assigning reference numerals to elements in the drawings, it should be noted that the same elements are given the same reference numerals as much as possible, even if they are displayed in different drawings, and similar reference numerals are Liven to similar elements.

In this document, terms such as first, second, and the like are used to distinguish one component from another component, and the component is not limited by the terms. In the accompanying drawings, some components are exaggerated, omitted, or schematically illustrated, and the size of each component does not entirely reflect the actual size.

Hereinafter, embodiments of the present disclosure will be described in detail with reference to the accompanying drawings.

The secondary battery, as known, includes an exterior pouch material that is a battery case and an electrode assembly housed in the exterior pouch material. Of course, the secondary battery can be constructed by embedding the electrode assembly together with the electrolyte and sealing the pouch exterior.

Figure 2:
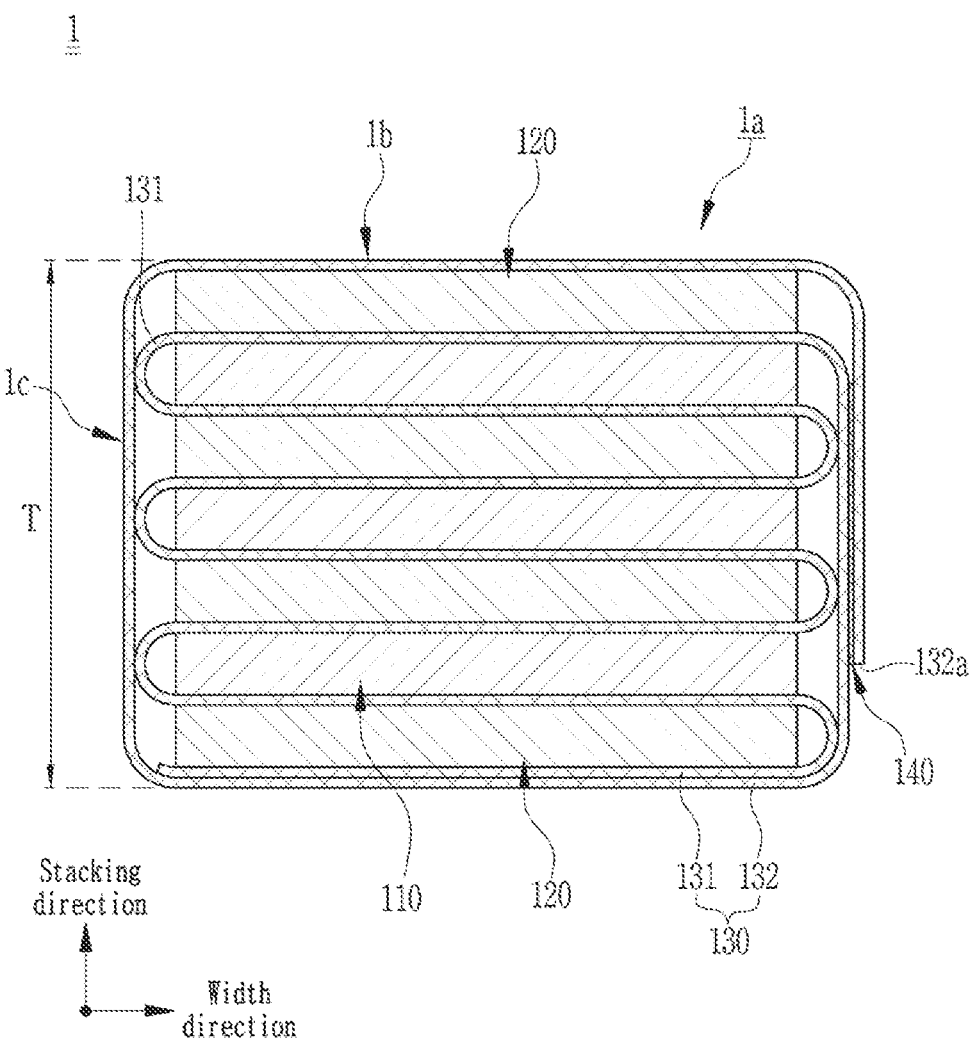
FIG. 2 is a cross-sectional view schematically showing an electrode assembly cut by lines I-I of FIG. 1.
Figure 3:
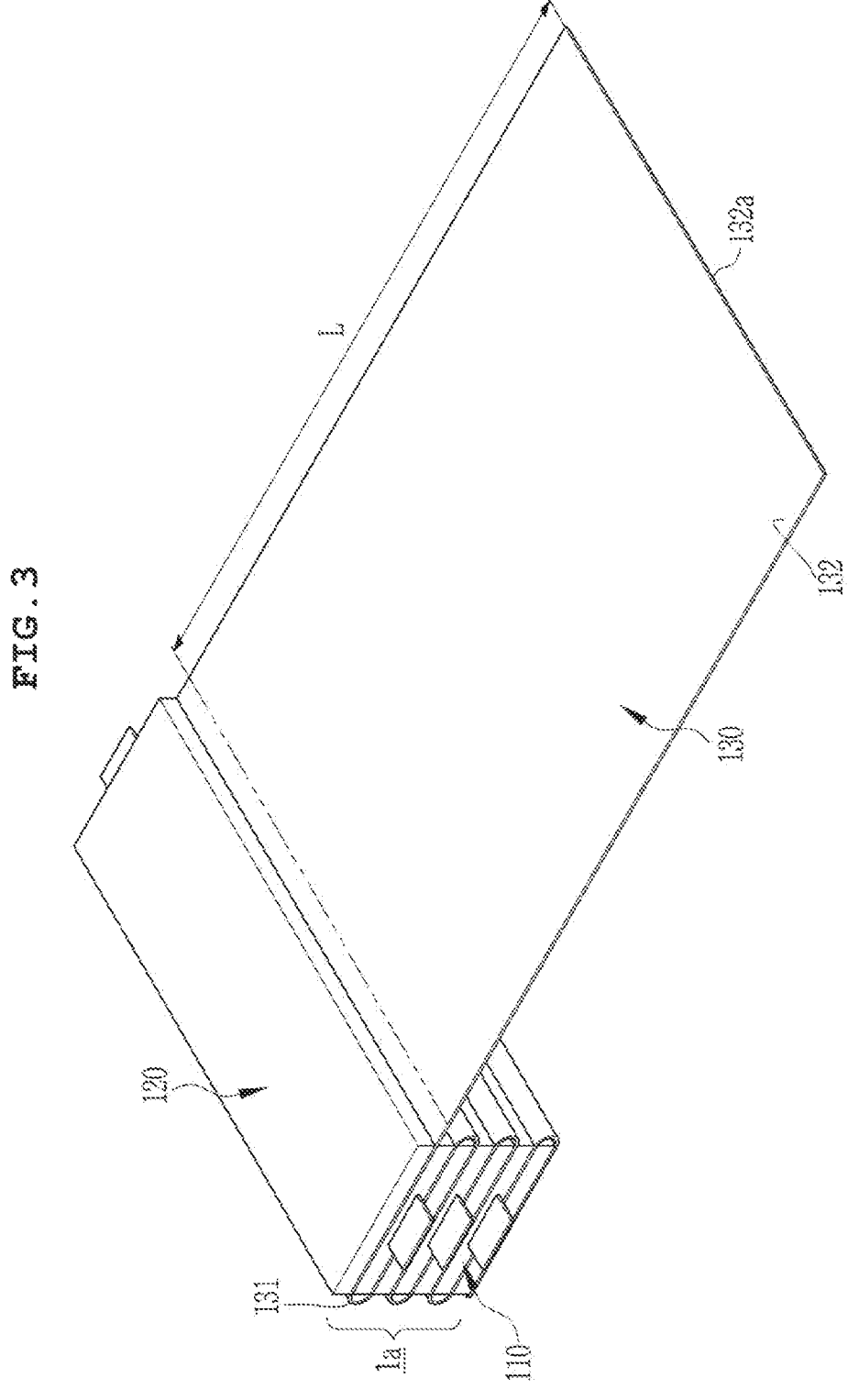
FIG. 3 is a view showing an outermost surface of an electrode assembly for a secondary battery according to an embodiment of this disclosure.

Referring to FIGS. 1 to 3, an electrode assembly 1 for a secondary battery, according to an embodiment of the present disclosure, is characterized in that the outer circumference of the stacked body 1A, including a first electrode plate 110, a separator 130, and a second electrode plate 120 is wound with the separator 130.

The electrode assembly 1 for a secondary battery includes at least one first electrode plate 110 at least one second electrode plate 120, and a separator 130 inserted and disposed to insulate between the first electrode plate 110 and the second electrode plate 120. The first electrode plate 110 may have the first electrode tab 111 protruding, and the second electrode plate 120 may have the second electrode tab 121 protruding.

Furthermore, according to the present disclosure, the first electrode tab 111 and the second electrode tab 121 extend in both directions so as to be oriented in opposite directions from both ends of the electrode assembly in the longitudinal direction.

As described above, according to an embodiment of the present disclosure, the electrode assembly 1 is a stack-type electrode assembly that is stacked and arranged with a separator 130 interposed between the first electrode plate 110 and the second electrode plate 120. Desirably, the electrode assembly may be a Z-folding type (referred to as a zigzag folding or an accordion folding) power generating element in which the first electrode plate 110 and the second electrode plate 120 are alternately inserted with the separator 130 folded in a zigzag shape in the stacking direction of the first electrode plate 110 and the second electrode plate 120. The electrode assembly 1 may be sequentially stacked with one or more first electrode plates 110 and one or more second electrode plates 120, and selectively, as shown in FIG. 2, the second electrode plate 120 may be disposed on the outermost layer of the electrode assembly, that is, the uppermost layer and the lowermost layer. Here, the first electrode plate 110 may be a cathode plate, and the second electrode plate 120 may be an anode plate.

Preferably, in one embodiment of the present disclosure, the outer circumference of the stacked electrode assembly, specifically the stacked body 1A, may be wound with the separator 130 to finish the exterior. In other words, according to the present disclosure, the outer circumference of the stacked body 1A is wound with the winding part 132, which is an unfolded portion of the separator 130, thereby performing a finishing treatment without loosening the stacked body. As to shown, the electrode assembly 1 may completely wrap the outermost part of the stacked body 1A with the separator 130 so as not to expose the side surface of the first electrode plate 110 and the side surface of the second electrode plate 120 to the outside.

In the present disclosure, the separator 130 may be formed in a long sheet shape including a folding pan 131 folded in a zigzag shape and a winding part 132 continuously extending from the folding part 131. In addition, the present disclosure may form a stacked body 1A by alternately inserting the first electrode plate 110 and the second electrode plate 120 between the folding part 131 of the separator 130 folded in a zigzag shape in the stacking direction of the first electrode plate 110 and the second electrode plate 120.

As shown in the present disclosure, the stacked body is wound around with the winding part 132 of the separator 130 along the circumferential direction of the stacked body centering on the imaginary axis extending in the protruding direction of the first and second electrode tabs 111 and 121. Preferably, the winding may be performed in a moving direction (i.e., the winding direction) of the winding part 132 as shown in the arrow direction of FIG. 6D.

Accordingly, in the present disclosure, since the first and second electrode tabs 111 and 121 protrude in a direction perpendicular to the winding direction of the separator 130, the winding may be easily performed by the separator 130 without interference with the first and second electrode tabs 111 and 121. In addition, in the present disclosure, since the outer circumference of the stacked body 1A, for example, the stacked surface 1B and the vertical surface 1C are constantly pressed through the winding operation by the winding part 132 of the separator 130, stability of the battery may be expected. The surface pressure applied to the stacked surface 1B can not only suppress the swelling phenomenon due to the characteristics of the pouch-type secondary battery but also ensure stable interfacial contact between the electrode plate and the separator constituting the electrode assembly. In addition, the surface pressure applied to the vertical surface 1C can maintain good alignment of the first and second electrode plates stacked between the folding parts of the separator.

As described above, the separator 130 may include a winding part 132 continuously extending from the end of the folding part 131 folded in a zigzag shape, and may provide an extension length L of the winding part 132 that can be wound a plurality of times in the peripheral direction of the outer surface of the stacked body 1A, preferably one or more times, and more preferably once. That is, the extended length L of the winding part 132 has a length capable of positioning the winding end of the winding part on the vertical surface 1C of the stacked body while surrounding the outer circumference of the stacked body 1A. Here, the vertical surface means two side surfaces facing each other in the width direction orthogonal to the stack direction of the stacked body 1A, and for reference, the stacked surface 1B means two sides flat surfaces facing each other in the stacking direction of the stacked body 1A.

In particular, in the electrode assembly 1, according to an embodiment of the present disclosure, the end of the separator 130, that is, the winding end 132A of the winding part 132 extending from the folding part 131, may be bonded to the bonding member 140 to prevent the separator 130 and/or the first and second electrode plates 110 and 120 from loosening. Of course, the bonding member 140 described in the present disclosure may be an insulating adhesive.

As is widely known to those skilled in the art, a conventional electrode assembly is finished by attaching an adhesive tape on the stacked surface of the electrode assembly. Unlike this, in the present disclosure, instead of an adhesive tape, a bonding region is formed between the winding part and the winding end of the separator through the bonding member 140. Furthermore, in the electrode assembly, according to an embodiment of the present disclosure, the bonding region with the winding end of the separator is disposed on a vertical surface 1C substantially orthogonal to the stacking direction of the electrode assembly. More specifically, the present disclosure allows the bonding region to be formed by applying the bonding member to be disposed on a vertical surface adjacent to the starting end of the winding part 132.

To this end, in the present disclosure, the bonding member 140 is applied on the outer surface of the winding part 132, coveting the vertical surface 1C of the stacked body 1A of the electrode assembly 1. Naturally, the winding part is extended in length so that the winding end 132A of the winding part 132 faces the vertical surface of the stacked body to which the bonding member 140 is applied. The electrode assembly 1 may cover at least half of the height T of the vertical surface 1C in the stacking direction with a winding end in order to ensure a reliable bonding force of the separator while ensuring a sufficient bonding region in the vertical surface 1C of the stacked body 1A.

Optionally, in the present disclosure, to reduce the amount of separator used to reduce manufacturing cost, the starting end of the winding part 132, that is, the winding part 132 of the separator 130 drawn between the second electrode plate 120 and the first electrode plate 110 provided on the upper side in the stacking direction of the stacked body 1A, is bent downward and the winding end 132A is extended along the outer circumference of the stacked body 1A so as to pass the winding start end 132B. Thus, in the electrode assembly 1, the winding end 132A of the separator may be wound once along the circumferential direction of the outer circumference of the stacked body 1A to encounter the winding part 132 on a vertical surface 1C adjacent to the start end of the winding part.

Accordingly, the present disclosure may implement an electrode assembly with a thin film by arranging a bonding region on a vertical surface 1C adjacent to the start end of the winding part. In this way, since the stacked surface 1B may be maintained flat without wrinkle, an electrode assembly with a thin film may be provided. As a result, a secondary battery with a thin thickness with improved volume energy density can be manufactured, and a good stack (lamination)

of the secondary batteries can be ensured by uniformly providing a thickness in the stacking direction of the secondary batteries.

In the electrode assembly, according to an embodiment of the present disclosure, the separator 130 is cut to provide a folding part 131, and an unfolded winding part 132. The separator 130 must be cut to a predetermined length capable of securing an extension length L of the winding part 132 sufficient to wrap around the outer surface of the stacked body 1A.

When the separator 130 is cut, since stress is concentrated on the cut surface of the separator 130, that is, the cut surface of the winding end 132A, the cut surface of the winding end is not smooth and has no choice but to form line irregularities (including cracks) having a predetermined roughness. Such fine irregularities may deteriorate the cutting quality of the cut surface and consequently cause detects in the secondary battery.

Therefore, the present disclosure can ensure reliable cutting quality by limiting the unevenness present on the cut surface of the winding end to a depth D in the range of 0 mm to 2 mm.

Figure 4:
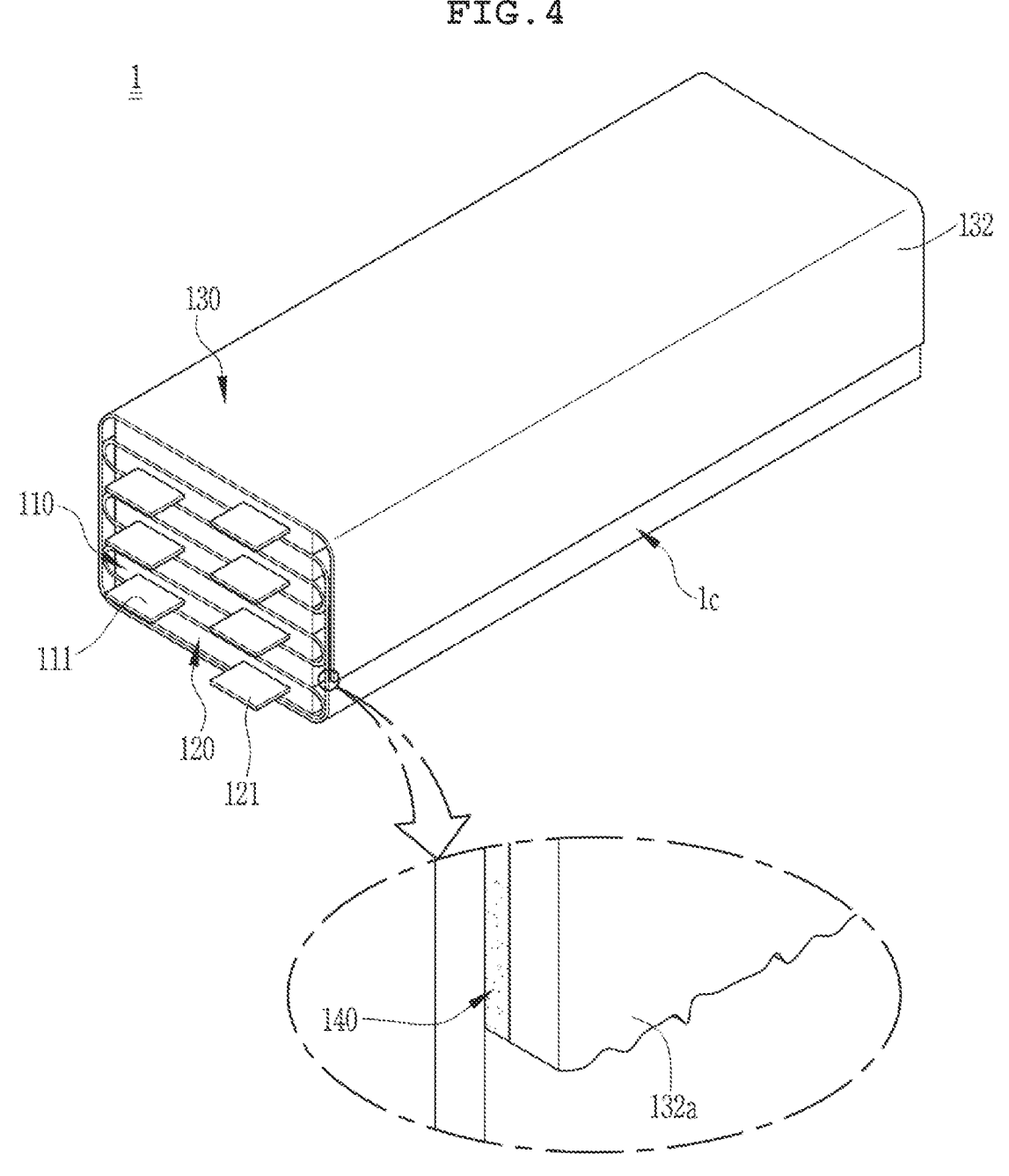
FIG. 4 is a perspective view schematically showing another example of an electrode assembly for a secondary battery according to an embodiment of the present disclosure.

FIG. 4 is a perspective view schematically showing another example of an electrode assembly for a secondary battery according to an embodiment of the present disclosure.

In another example of the present disclosure, the electrode assembly 1 for a secondary battery includes at least one first electrode plate 110, at least one second electrode plate 120, a separator 130 inserted and disposed to insulate between the first electrode plate 110 and the second electrode plate 120, and a bonding member 140 for bonding the winding end 132A of the winding part 132 continuously extended from the folding part of the separator. As known to those skilled in the art, the first electrode tab 111 and the second electrode tab 121 protrude from the first electrode plate 110 and the second electrode plate 120. Here, when the first electrode plate 110 is a cathode plate, the second electrode plate 120 may be an anode plate, and in this case, the first electrode tab may be a cathode tab, and the second electrode tab may be an anode tab.

As shown, in the present disclosure, the first electrode tab 110 and the second electrode tab 120 are separated from one end of the longitudinal direction of the electrode assembly 1 and extended in the same direction, i.e., in one direction (unidirectional) to be parallel to each other.

In particular, the electrode assembly 1 is wound by an unfolded winding part 132 of the separator 130 along the outermost circumference of the outer surface of the stacked body. A bonding member 140 is applied on the outer surface of the winding part 132, covering a vertical surface substantially perpendicular to the stacking direction of the stacked body, and the winding end 132A of the winding part 132 is fixed with the bonding member 140 applied on the vertical surface. According to the present disclosure, the stack/folding structure of the first and second electrode plates and the separator can be reliably maintained through external finishing of the electrode assembly.

Figure 5:
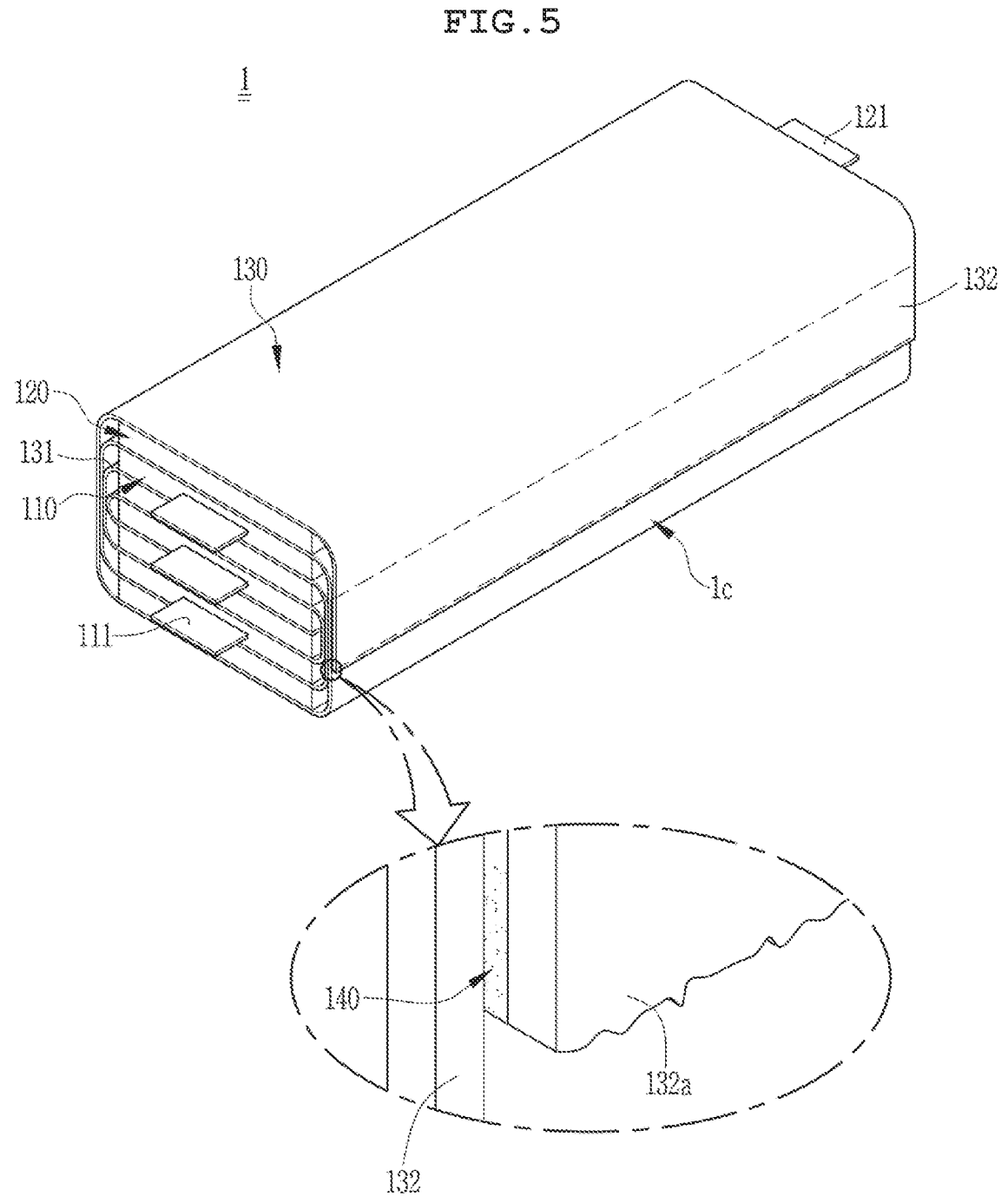
FIG. 5 is a perspective view schematically showing an electrode assembly for a secondary battery according to another embodiment of the present disclosure.

FIG. 5 is a perspective view schematically showing an electrode assembly for a secondary battery according to another embodiment of the present disclosure. The electrode assembly shown in FIG. 5 is a modified example of the electrode assembly according to one embodiment of the present disclosure shown in FIGS. 1 to 3, and has a very similar structure except for the folding method of the separator, so descriptions of similar or identical configurations will be excluded here to aid a clear understanding of the present disclosure.

As described above, the electrode assembly, according to another embodiment of the present disclosure, is a stack-type electrode assembly in which a separator 130 is interposed and arranged between the first electrode plate 110 and the second electrode plate 120, Preferably, the electrode assembly is a winding-type power generating element in which the first electrode plate 110 and the second electrode plate 120 are alternately spaced apart from each other on one surface of the separator, and the separator 130 is repeatedly folded in the same direction.

As is known to those skilled in the art, in the electrode assembly, according to another embodiment of the present disclosure, at least one first electrode plate 110 is spaced apart on one surface of the separator and at least one second electrode plate 120 is spaced apart on the other surface of the separator to form the electrode assembly, and the separator may be repeatedly folded in the same direction.

Preferably, in one embodiment of the present disclosure, the outer circumference of the stack-type electrode assembly, specifically the stacked body 1A, may be wound with the separator 130 to finish the exterior. In other words, according to the present disclosure, the outer circumference of the stacked body 1A is wound with the winding part 132, which is an unfolded portion of the separator 130, thereby performing a finishing treatment without loosening the stacked body. As shown, the electrode assembly 1 may completely wrap the outermost part of the stacked body 1A with the separator 130 so as not to expose the side surface of the first electrode plate 110 and the side surface of the second electrode plate 120 to the outside.

In the present disclosure, the separator 130 may be formed in a long sheet shape, including a folding part 131 repeatedly folded in one direction and a winding part 132 continuously extending from the folding part.

In the electrode assembly 1, according to another embodiment of the present disclosure, the end of the separator 130, that is, the winding end 132A of the winding part 132 extending from the folding part 131, may be bonded with the bonding member 140 to prevent the separator 130 and/or the first and second electrode plates 110 and 120 from loosening. Of course, the bonding member 140 described in the present disclosure may be an insulating adhesive.

As shown in the present disclosure, a bonding region is formed by interposing a bonding member 140 between the winding part and the winding end of the separator. Furthermore, in the electrode assembly, according to another embodiment of the present disclosure, the bonding region with the winding end of the separator is disposed on a vertical surface 1C substantially orthogonal to the stacking direction of the electrode assembly.

The electrode assembly 1 may cover at least half of the height of the vertical surface 1C in the stacking direction with a winding end in order to ensure a reliable bonding force of the separator while ensuring a sufficient bonding region in the vertical surface 1C of the stacked body 1A.

In addition, the electrode assembly for a secondary battery, according to the present disclosure, may be, for example, a jelly-roll type electrode assembly formed by minding in a spiral shape with a separator interposed between the first electrode plate and the second electrode plate. The electrode assembly is not limited to a specific form as long as the electrode assembly may provide a predetermined thickness in the stacking direction while repeatedly stacking the first electrode plate, the separator, and the second electrode plate.

As described above, the present disclosure is characterized in that the winding end of the separator is positioned on the vertical surface of the electrode assembly while winding the outer surface of the electrode assembly with the separator. The following is a description of a manufacturing method of wrapping the outer surface of the electrode assembly with a separator to finish the treatment. Here, the present disclosure will explain a winding method of a separator based on a Z-folding type electrode assembly.

Figure 6A:
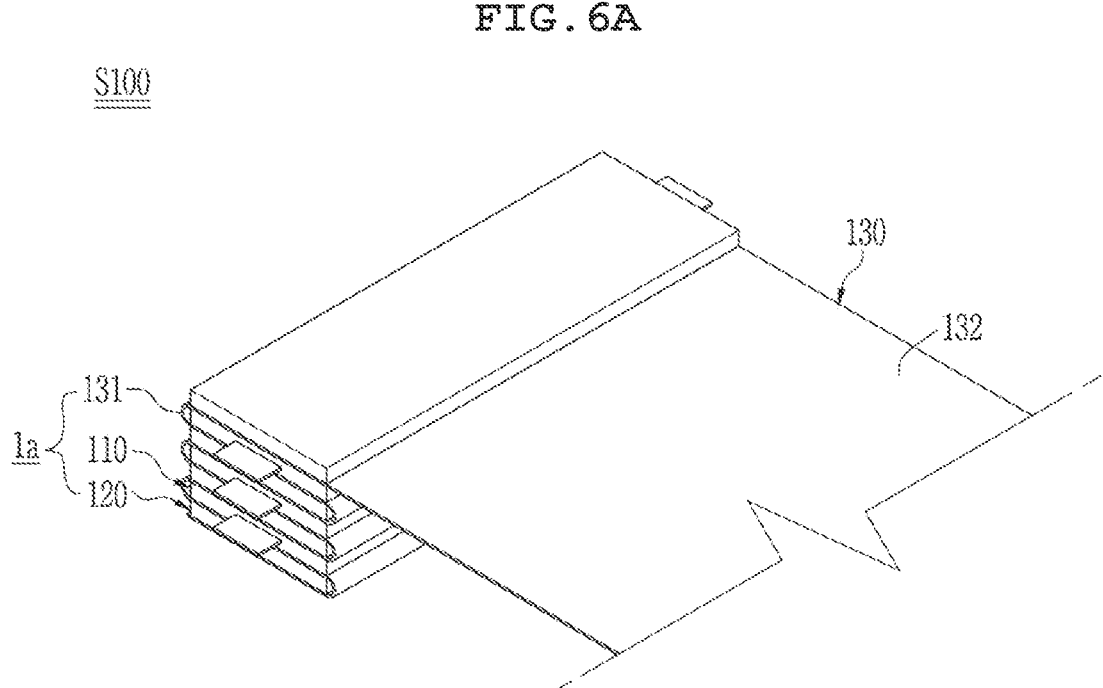
FIGS. 6A to 6F are schematic diagrams showing step-by-step methods of finishing an electrode assembly for a secondary battery according to the present disclosure.
Figure 6B:
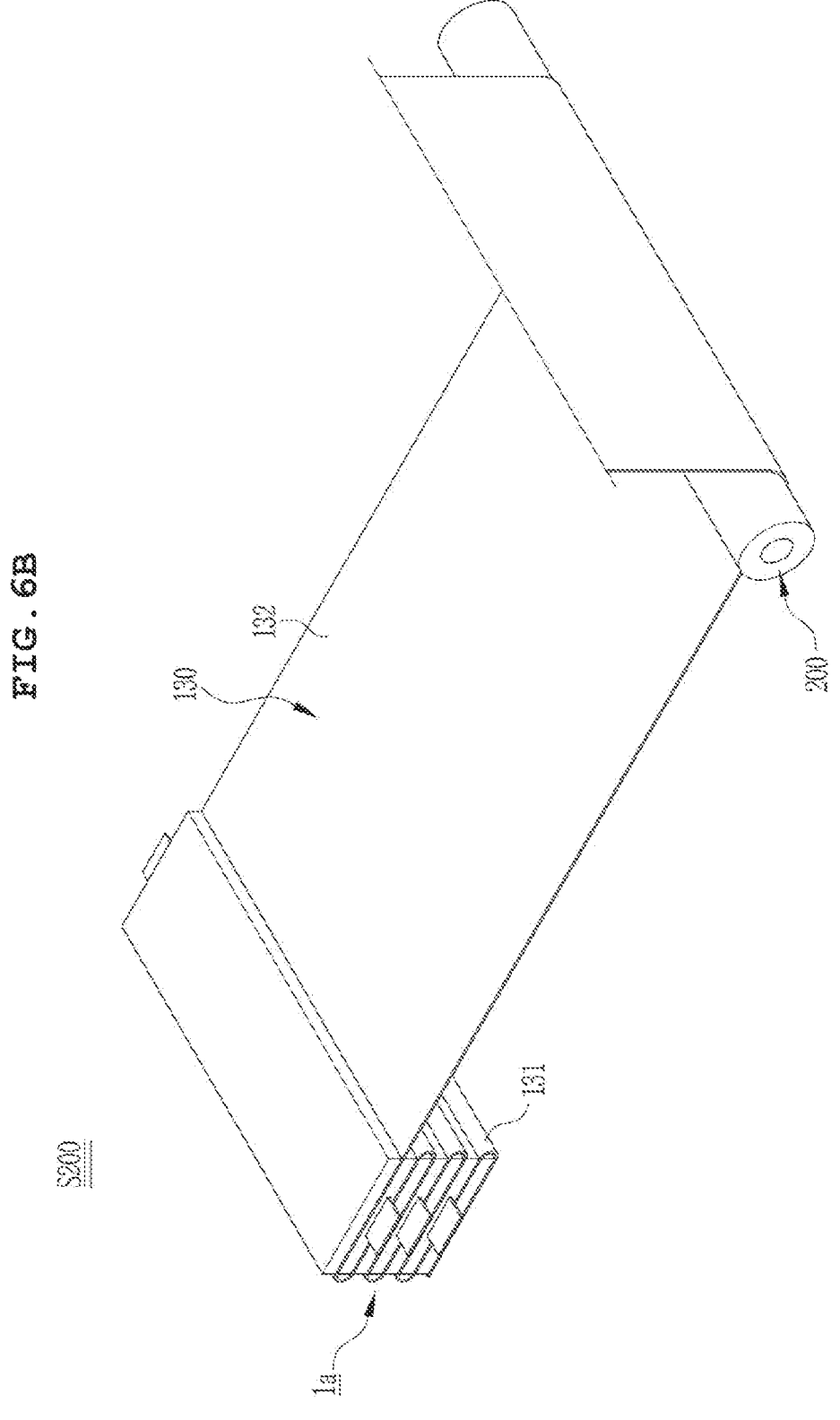

Referring to FIG. 6A, the present disclosure includes a step of forming S100 a stacked body 1A by interposing a separator 130 between at least one first electrode plate 110 and at least one second electrode plate 120. As shown, the separator 130 includes a folding part 131 folded in a zigzag shape and a winding part 132 continuously emending from the end of the folding part 131. Specifically, in step S100, a stacked body 1A may be formed, in which the first electrode plate 110 and the second electrode plate 120 are alternately stacked between the folding part 131 of the separator 130 folded in a zigzag shape in the stacking direction of the first electrode plate 110 and the second electrode plate 120.

Figure 6C:
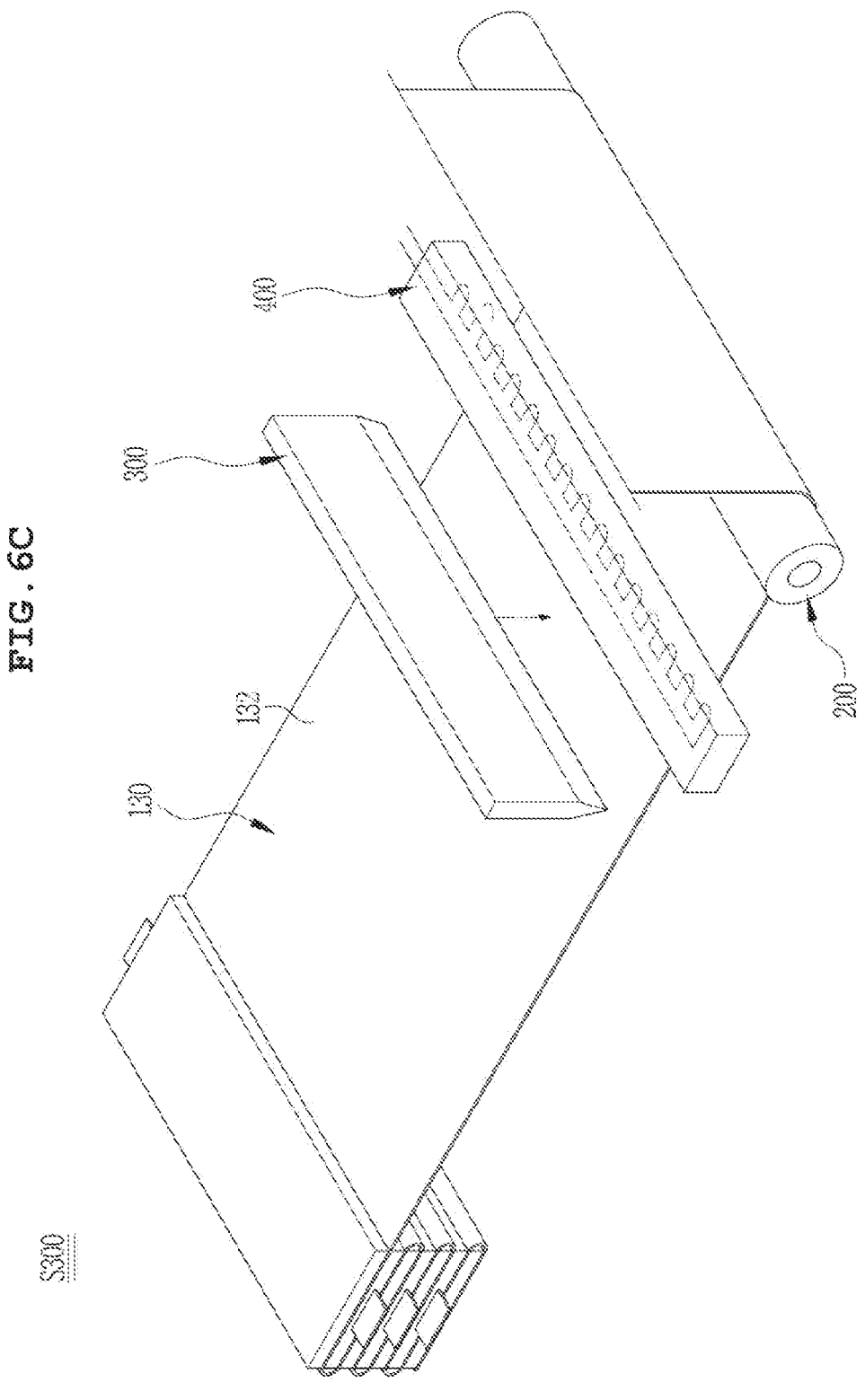

After forming the stacked body, the present disclosure may include a step S200 of providing a tension to the separator 130 prior to cutting the separator shown in FIG. 6C.

When tension is not maintained constantly, the separator may be wrinkled, and accordingly, a problem of poor stacking may occur, and when an external physical force such as cutting is applied to the separator, stress is concentrated on a cut surface at a winding end, causing the separator to be torn.

In order to maintain the tensioned state of the separator 130 without loosening, according to the present disclosure, constant tension may be applied to the separator through the tension adjusting to member 200. As shown, the tension adjusting member 200 may include a tension roller, a clamp capable of clamping or releasing the clamping of the separator, and the like.

In addition, the step of providing a tension S200 intervene; from step S100 to step S300 and from step S100 to step S600 to induce smooth folding of the separator, smoothly cut the cut surface of the separator, and effectively wind up the winding part of the separator.

The present disclosure includes a step S300 of cutting the separator 130 as shown in FIG. 6C. Preferably, in the present disclosure, a separator with a long length is cut so as to be wound multiple times, preferably once or more, and more preferably once in the winding direction along the outermost part of the outer surface of the stacked body.

In other words, the separator 130 includes a winding part 132 corresponding to an unfolded part after folding the first electrode plate and the second electrode plate to be alternately stacked. The winding part 132 has an extended length (L; see FIG. 3) capable of wrapping the outer surface of the stacked body in a roll-like manner. Additionally, the extended length of the winding part 132 has a size longer than the outer circumferential length of the stacked body.

As shown in the step S300 of the present disclosure, the separator may be cut with a knife, a laser, a hot wire, or the like.

When the separator is cut, the cutting quality of the cutting surface of the separator 130, that is, the winding end 132A (see FIG. 1), is improved so as to provide a smooth cutting surface. Therefore, the present disclosure makes the irregularities present on the cut surface of the winding end have a depth (D; see FIG. 1) in the range of 0 mm to 2 mm.

As described above, in the present disclosure, the cutting member 300 may be arranged in a width direction of the separator orthogonal to the length extension direction of the separator 130 to which tension is applied so that fine irregularities (see FIGS. 1, 4, and 5) of the winding end 132A of the separator 130 may be smoothly cut in the cutting step.

Optionally, in the present disclosure, the separator 130 is preheated to soften a part adjacent to a preset cutting line (i.e., a winding end), and thus, the cutting surface may be smoothly processed while minimizing the generation of cracks and/or tears on the cutting surface at the winding end. To this end, the present disclosure may further include a heating member 400 disposed of adjacent to the preset cutting line of the separator 300. The heating member 400 is built into the tension adjusting member 200 and may apply tension to the separator while preheating the cut surface of the separator through the tension adjusting member. Alternatively, the heating member may be interposed between the tension adjusting member 200 and the cutting member 300 so as to be disposed of closer to the upstream side of the cutting member.

Here, the heating member 400 is set to set the heating temperature below the softening point (the temperature at which thermal deformation starts) or melting point of the polymer resin-based separator, for example. By preheating the portion of the preset cutting line of the separator at the set temperature of the above-described heating member, the cut surface of the winding end can be smoothly cut by softening the physical properties of the separator while preventing thermal deformation in the portion of the preset cutting line of the separator. On the other hand, when the separator is heated to a softening point or a melting point or more, a cutting surface may not be smooth and may be re-fused. In addition, according to the present disclosure, at the time of cutting, the scattering of cutting components may be prevented in advance through a softening process of a separator and also may be easily cut even with a small pressing force.

Figure 6D:
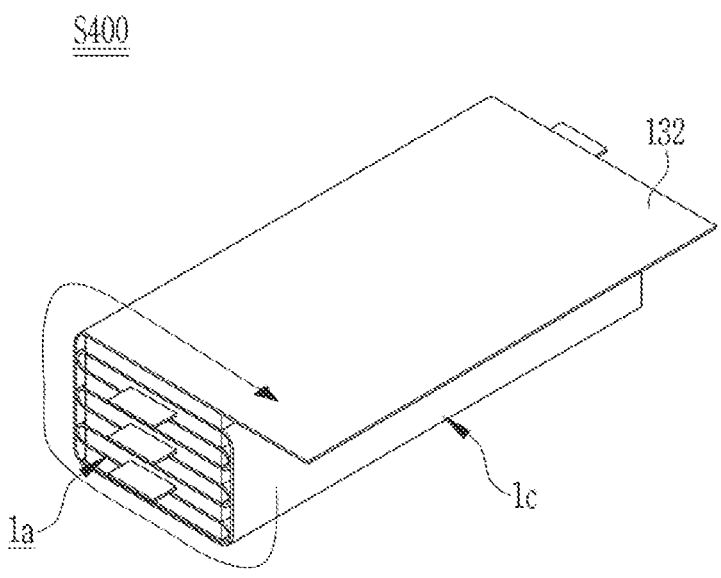

FIG. 6D shows a step S400 of winding the outer periphery of the stacked body with the separator 130. In the winding step S400, in order to prevent a gap between the folding part of the separator 130 and the first and second electrode plates 110 and 120, the winding part 132 of the separator 130 may be wound at least once in the circumferential direction of the stacked body 1A.

Preferably, the winding part 132 of the separator 130 may be wound in the direction of the arrow of FIG. 6D to minimize an opportunity of overlapping the stacked surface and the winding part of the stacked body, thereby excluding an increase in thickness with respect to the stacking to direction of the electrode assembly. That is, in the present disclosure, as shown in FIG. 2, the second electrode plate 120 (for example, an anode plate) disposed on the lowermost layer is positioned at the starling end of the folding part 131, and the second electrode plate 120 disposed on the uppermost layer is positioned at the end portion of the folding part corresponding to this. The winding part 132, extending from the end of the folding part 131, is wound along the circumferential direction of the electrode assembly so as to cover the lowermost layer of the stack and the uppermost layer of the stacked body in that order.

In the present disclosure, the cutting step S300 of the separator and the winding step S400 of the separator may be performed regardless of the order. As described, the present disclosure may process the winding step S400 after pre-treating the cutting step S300 and vice versa.

Figure 6E:
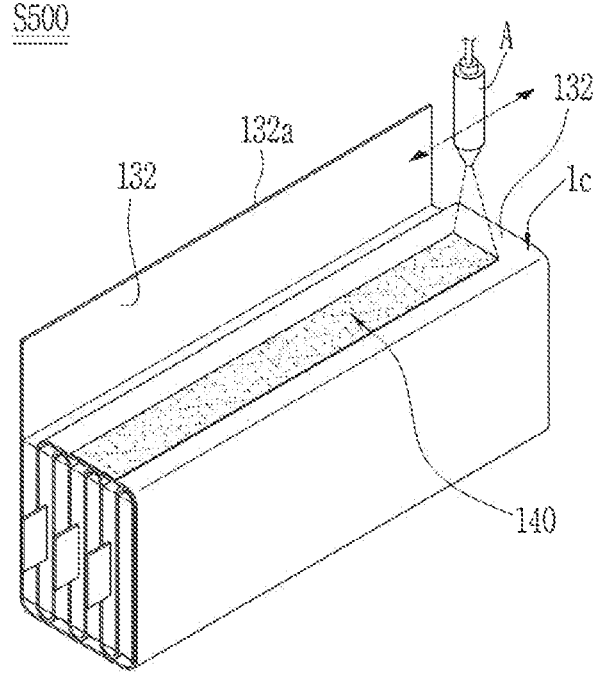

Then, the present disclosure includes a step S500 of applying a bonding member 140, for example, an insulating adhesive, on the outer surface of the stacked body 1A (see FIG. 6E).

Specifically, in the present disclosure, the bonding member 140 is applied on the vertical surface 1C disposed in a direction orthogonal to the stacked surface of the stacked body 1A. More specifically, the bonding member 140 is applied on the outer surface of the winding part 132, overlapping the vertical surface along the longitudinal direction of the electrode assembly.

As shown, the bonding member 140 may be applied only on a vertical surface overlapping the winding end of the winding part surrounding the outer surface of the stacked body but is not limited thereto, and in order to maintain a good winding state of the winding part, bonding members may be applied on both vertical surfaces substantially orthogonal to the stacking direction of the stacked body.

In addition, the bonding member 140 is applied by means of the adhesive spray nozzle (A) as shown, and the bonding member may be applied to ½ of the height of the vertical surface 1C in the stacking direction.

Corresponding to the applying position of the bonding member, the present disclosure may to cut the winding part 132 with a predetermined extension length in step S300 so that the winding end 132A of the winding part 132 may be positioned on the vertical surface of the electrode assembly. That is, in the present disclosure, the winding part is cut in step S300 so that at least ½ of the height of the vertical surface in the stacking direction may be covered with the winding end 132A of the separator 130.

In the above, it has been described that step S500 is performed after step S400, but the present disclosure is not limited thereto, and the above-described step S400 and the step S500 may be performed simultaneously, or the step S400 may be performed after step S500 is first performed.

Figure 6F:
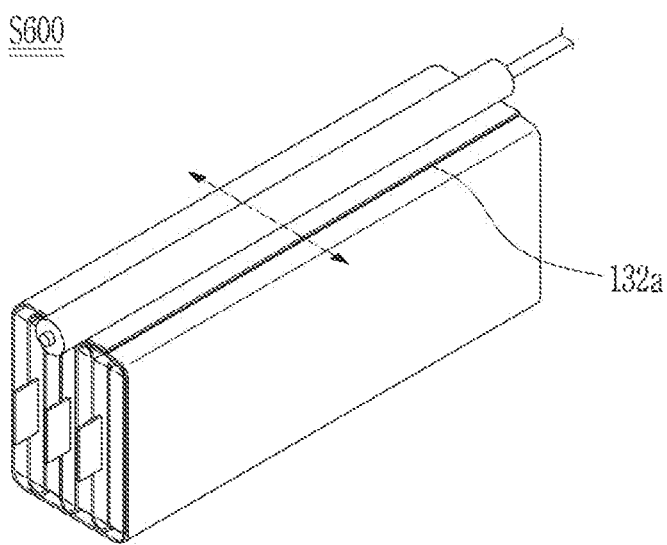

Finally, according to the present disclosure, the end of the separator, that is, the winding end 132A may be bonded and fixed to the outer surface of the stacked body through step S600 (FIG. 6F). According to the present disclosure, the winding end 132A is bonded to the winding part surrounding the outer periphery of the stacked body through the bonding member 140 applied on the vertical surface 1C of the stacked body.

Furthermore, in the present disclosure, the winding end may be pressed into close contact with the vertical surface by using the pressing of a brush/roller or the pneumatic pressure of a blow in order to ensure a reliable bonding state between the winding end of the separator and the vertical surface of the stacked body. As shown, the roller may be driven in close contact the vertical surface of the electrode assembly and may press and attach a winding end of the separator to a winding part of the separator. The roller may be driven in a driving section set in the direction of the arrow shown in FIG. 6F, that is, a stacking direction, to shorten the driving section of the roller and increase work efficiency. In addition, since the roller is formed to be longer than the length of the electrode assembly in the longitudinal direction, it is possible to reduce a phenomenon in which the winding end is pushed during bonding.

The present disclosure has been described in detail through specific examples. Examples are for specifically describing the present disclosure, and the present disclosure is not limited thereto. It will be apparent that variations or improvements are possible by those skilled in the art within the technical spirit of the present disclosure.

All simple modifications and alterations of the present disclosure fall within the scope of the present disclosure, and the specific protection scope of the present disclosure will be clearly defined by the appended claims.

What is claimed is:

1. An electrode assembly for a secondary battery, the electrode assembly comprising a stacked body comprising:
   a first electrode plate;
   a second electrode plate; and
   a separator interposed between the first electrode plate and the second electrode plate,
   wherein the separator includes a folding part folded to allow the first electrode plate and the second electrode plate to be alternately stacked and a winding part continuously extending from an end of the folding part, and
   wherein the winding part winds an outer surface of the stacked body and is extended in length such that a winding end is positioned on a vertical surface facing a width direction orthogonal to a stacking direction of the stacked body, and is exterior-finished.

2. The electrode assembly of claim 1, wherein the bonding region of the separator is formed on the vertical surface of the stacked body.

3. The electrode assembly of claim 1, wherein the folding part is folded in a zigzag shape.

4. The electrode assembly of claim 1, wherein the winding end covers more than ½ of the height of the vertical surface in the stacking direction.

5. The electrode assembly of claim 1, wherein the winding end of the separator is bonded with a bonding member disposed on an outer surface of the winding part that winds the outer periphery of the stacked body.

6. The electrode assembly of claim 1, wherein the winding end of the separator comprises irregularities having a depth ranging from 0 mm to 2 mm on a cut surface.

7. The electrode assembly of claim 5, wherein the bonding member comprises an adhesive.

8. A method of manufacturing an electrode assembly for a secondary battery, the method comprising:
   forming a stacked body in which first electrode plates and second electrode plates are alternately stacked between a folded separator;
   cutting the separator to have an extended length capable of winding around an outer periphery of the stacked body;
   winding an outer periphery of the stacked body with the separator;
   applying a bonding member on the outer surface of the stacked body; and
   bonding the separator to a bonding member applied to an outer surface of the stacked body;
   wherein the separator is formed to include a folding part folded to allow the first electrode plate and the second electrode plate to be alternately stacked and a winding part continuously extending from an end of the folding part, and
   wherein the winding part winds the outer surface of the stacked body and is extended in length such that a winding end is positioned on a vertical surface facing a width direction orthogonal to a stacking direction of the stacked body while winding the outer surface of the stacked body.

9. The method of claim 8, wherein in applying the bonding member, the bonding member is applied on the vertical surface of the stacked body.

10. The method of claim 8, wherein in bonding the separator, the winding end of the separator is pressed against and brought in close contact with the vertical surface of the stacked body.

11. The method of claim 8, wherein the method further comprises providing a tension to the separator before cutting the separator.

12. The method of claim 8, wherein the method further comprises preheating a preset cutting line portion of the separator.

13. The method of claim 8, wherein the winding end of the separator comprises irregularities having a depth ranging from 0 mm to 2 mm on a cut surface.

* * * * *